United States Patent [19]
Ehm et al.

[11] 3,856,337
[45] Dec. 24, 1974

[54] PIPE COUPLING

[75] Inventors: Karl Horst Ehm, Mulheim; Paul Schatton, Dusseldorf; Joachim Kruse, Meerbusch, all of Germany

[73] Assignee: Mannesmann Aktiengesellschaft, Dusseldorf, Germany

[22] Filed: July 6, 1972

[21] Appl. No.: 269,336

[30] Foreign Application Priority Data
July 9, 1971 Germany.......................... 2134274

[52] U.S. Cl............................... 285/334, 285/334.4
[51] Int. Cl............................................. F16l 25/00
[58] Field of Search.................. 285/333, 334, 334.4

[56] References Cited
UNITED STATES PATENTS
2,992,019  7/1961  MacArthur..................... 285/334 X
3,489,437  1/1970  Duret............................. 285/334 X FOREIGN PATENTS OR APPLICATIONS
1,243,605  7/1967  Germany............................ 285/333

Primary Examiner—Dave W. Arola
Attorney, Agent, or Firm—Ralf H. Siegemund

[57] ABSTRACT

A pipe coupling structure as between a first and a second pipe with tapered external and internal threading, respectively, with an unthreaded end portion of the externally threaded pipe having an annular, radially outwardly directed convexity of particular diameter of the crest; the second pipe has an unthreaded portion beyond its internal thread and in axial direction into the pipe with an annular, radially inwardly directed convexity and a crest diameter slightly larger than said particular diameter.

3 Claims, 2 Drawing Figures

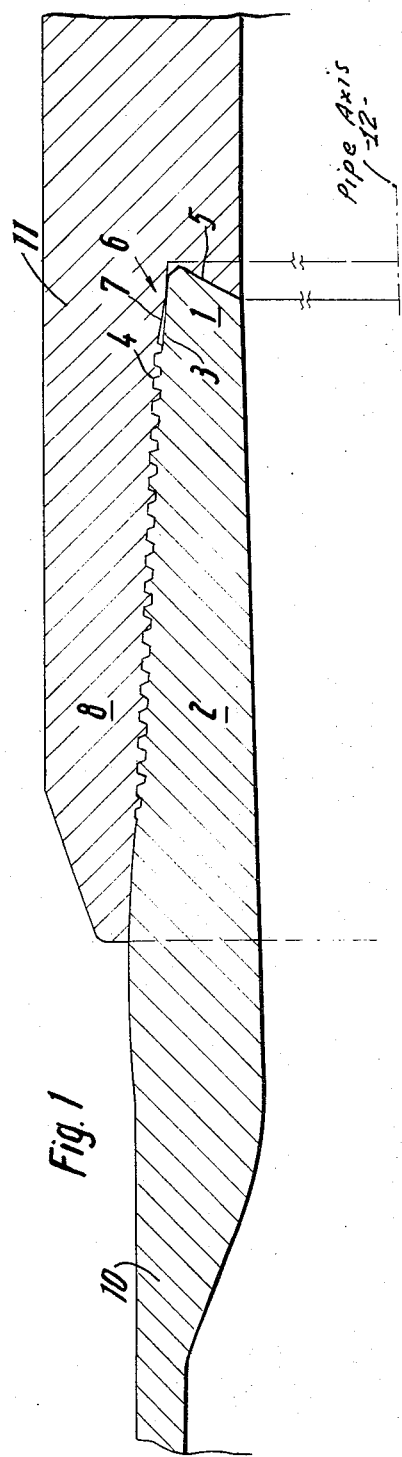
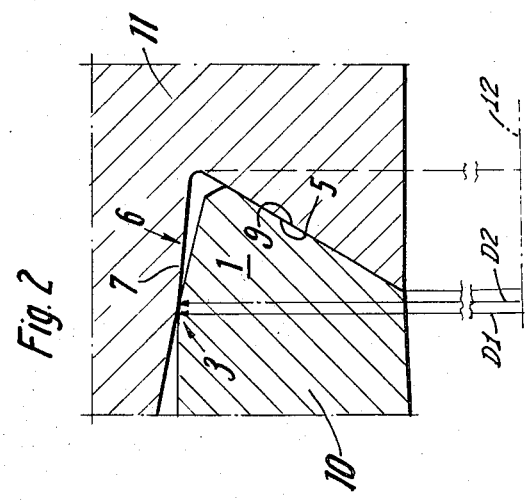

PIPE COUPLING

BACKGROUND OF THE INVENTION

The present invention relates to a coupling structure for pipes with threaded ends, particularly of the type used in oil pipelines, and wherein the coupling must be sealed gas tight.

The threaded ends of such pipes are usually tapered, and they experience significant load and wear during assembly as well as during use. On the other hand, it is often desirable to reuse the pipes in that the pipes are unscrewed, exchanged, etc. The utilization of special sealing inserts is usually not possible; i.e., the seal should be effected by metal to metal contact.

DESCRIPTION OF THE INVENTION

It is an object of the present invention to provide for gas tight pipe coupling using threaded pipe ends which are reusable, for threading the same pipe ends together again in the same or in a different combination. Moreover, the sealing surfaces must not undergo irreversible deformation, at least not to any significant extent, upon tightening the threaded joint, otherwise reuse under similar sealing conditions becomes questionable. Also, frequent reuse must not produce undue wear.

In accordance with the preferred embodiment of the invention, it is suggested to provide the pipe having external threading with an unthreaded end, and this end portion is to have an annular, radially outwardly directed convexity with a crestline of particular diameter. The other pipe having internal threading and an abutment shoulder beyond the threading, i.e., deeper into the pipe, is to have a radially inwardly directed, annular convexity with a crestline having a diameter somewhat smaller than the particular diameter. The two convexities have axial disposition respectively on and in the pipes so that they locate substantially in opposite position relation when the one pipe has been inserted into the other one.

Upon threading the first pipe into the second pipe, the two radially facing convexities meet, and there is some mutual displacement upon application of force and threading torque for screwing the one pipe end into the other one, but material displacement actually flattens the convexities very little. Instrumental here is that the convexities are not pronounced, and the resulting flattening has rather little conicity to that the engaging sealing surface and surface areas at the convexities undergo very little wear; frequent reuse is quite possible accordingly.

The two convexities preferably have relative position so that in the final threading phases mutual displacement decreases. This way a relatively large tolerance range is obtained for threading the first pipe into the second pipe until hitting the abutment shoulder or shoulder stop. Also sealing pressure interaction of the engaging surfaces varies little, even if there is unfavorable pairing of pipes as to manufacturing tolerances.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 illustrates a section view of a portion of two pipe ends which have been threadedly coupled and are improved in accordance with the preferred embodiment of the invention; and FIG. 2 shows a detail of FIG. 1 on an enlarged scale.

DESCRIPTION OF THE DRAWINGS

Proceeding now to the detailed description of the drawings, FIG. 1 illustrates a first pipe 10 and a second pipe 11 which are threadedly interconnected, with gas tight sealing of the interior of the pipeline. Pipe 10 has an externally threaded end portion 2, which is slightly tapered. Pipe 11 has an internally threaded end portion 8, which is likewise tapered in matching configuration as to the tapered end 2 of pipe 10.

The external threading on pipe end 2 does not extend all the way to the end of the pipe; rather, there is an unthreaded portion 1, and the front end face 9 of pipe 10 is inwardly conically, or frusto-conically contoured but with a rather wide apex angle. Correspondingly, the internal threading 4 of pipe end 8, does not extend all the way to an abutment shoulder or stop surface 5 in pipe 11, the shoulder having likewise frusto-conical configuration, and immediately adjacent shoulder 5 there is no threading.

The unthreaded pipe end 1 is now provided with a radically outwardly, convexly bulging portion 3. A radically inwardly but also convexly bulging surface portion 6 is provided between the end of internal threading 4 of pipe 11 and the abutment shoulder 5 thereof. These convexities loop annularly around the respective coaxial axes of the pipes. The crest of the convex portion 6 has a diameter D1 in relation to the pipe's axis 12 that is slightly smaller than the corresponding diameter D2 of the crest of the outwardly bulging convex portion 3.

As pipe 10 is threaded into pipe 11, the two opposing convexities are in fact urged against each other so that the joint is in fact gas-tightly sealed. Threading continues until contact end face 9 of pipe 10 engages the conical abutment shoulder 5 of pipe 11. As these conical faces engage, end portion 1 is subjected to a radially outwardly directed expansive force which reinforces the sealing engagement of the convexities 3 and 6.

It is of advantage to place the crests of the convexities so that upon threading pipe 10 into pipe 11, the crest of convex portion 3 must push past the crest of convex portion 6, so that the mutual displacement decreases with the final threading turns until the end face 9 of pipe end 1 engages abutment shoulder 5.

It can also be seen that the two respective trailing portions of the convexities (considering axial movement of the pipes relative to each other upon inserting pipe 10 into pipe 11), are actually almost (but not quite) cylindrical due to the taper. The mutual displacement of material will decrease with progression of threading if the trailing portions of the convexities actually exhibit locally an inverse conicity and taper; the trailing portion of convexity 3 has contour corresponding to a very slight increase in the internal pipe diameter, up to the crestline of the bulge. The portion 7 of convexity 6 has an internal diameter which is slightly larger for increasing distance from the crestline, towards shoulder 5. As the two crests pass each other, shortly before completion of threaded insertion of pipe 10 into pipe 11, these rather flat portions engage, in part, but there is not involved any large area of surface-to-surface contact.

It can now be seen that the sealing joint as established avoids large area plastic deformation of mutually engaging sealing surfaces. Such large area deformation occurs primarily in known, conical or annular surfaces when engaging. These deformations cannot be avoided as surfaces which extend parallel to each other and pertain to exchangeable parts, will seal gas tightly only when made with zero tolerance, and that, of course, is impossible in principle. In the present example, the seal is obtained by engagement of the oppositely directed, rather shallow annular convexities. The deformation that occurs will not impede reuse of the parts, and even upon exchanging pipes, each time they will be interconnected again in a tightly sealing relation.

The invention is not limited to the embodiments described above but all changes and modifications thereof not constituting departures from the spirit and scope of the invention are intended to be included.

We claim:

1. In a pipe coupling structure as between first and second pipes with tapered external and internal threading, respectively, of the first and second pipe to be threadedly interconnected upon threading the first pipe into the said second pipe in a particular axial direction, each pipe having an axis, the improvement comprising, an unthreaded end portion of the first pipe with the external threading, having an annular, radially outwardly directed first convexity, having a first crest, the first crest having particular diameter relative to the axis of the first pipe, and in a plane transverse thereto, the outer diameter of the unthreaded portion of the first pipe gradually decreasing from the first crest in the axial direction of insertion of the first pipe, the second pipe having internally an unthreaded portion, beyond the internal thread and in axial direction into the pipe; the unthreaded portion of the second pipe having an annular, radially inwardly directed second convexity having a second crest of a diameter, relative to the axis of the second pipe slightly smaller than said particular diameter of the first crest, the inner diameter of the unthreaded portion of the second pipe gradually decreasing towards the second crest in the axial direction of insertion of the second pipe, the first and second convexities sealingly engage upon threaded insertion of the first pipe in the second pipe.

2. In a pipe coupling structure as in claim 1, wherein the first pipe has a frusto-conical end face, and wherein the second pipe has a matching internal frusto-conical shoulder for abutment with the frusto-conical end face of the first pipe upon threading the first pipe into the second pipe.

3. In a pipe coupling structure as in claim 1, wherein the said convexities have relative axial position, so that the convexity of the first pipe, when inserted in the second pipe, is farther from the threaded end of the second pipe than the convexity of the second pipe, so that the said portions of decreasing diameter sealingly engage each other.

* * * * *